(12) United States Patent
Rambo (10) Patent No.: US 11,090,600 B2
(45) Date of Patent: Aug. 17, 2021

(54) PARTICLE SEPARATOR ASSEMBLY FOR A TURBINE ENGINE

(71) Applicant: General Electric Company, Schenectady, NY (US)

(72) Inventor: Jeffrey Douglas Rambo, Mason, OH (US)

(73) Assignee: General Electric Company, Schenectady, NY (US)

(*) Notice: Subject to any disclaimer, the term of this patent is extended or adjusted under 35 U.S.C. 154(b) by 578 days.

(21) Appl. No.: 15/397,797

(22) Filed: Jan. 4, 2017

(65) Prior Publication Data

US 2018/0229167 A1    Aug. 16, 2018

(51) Int. Cl.
*F01D 25/32* (2006.01)
*F02C 7/141* (2006.01)
(Continued)

(52) U.S. Cl.
CPC .............. *B01D 49/02* (2013.01); *B01D 45/16* (2013.01); *F01D 25/32* (2013.01); *F02C 7/052* (2013.01);
(Continued)

(58) Field of Classification Search
CPC ........ B01D 49/02; B01D 45/02; B01D 45/16; B01D 2259/4575; F02C 7/05; F02C 7/052; F02C 7/055; F02C 6/18; F02C 7/30; F02C 7/12; F02C 7/125; F02C 7/14; F02C 7/141; F02C 7/143; F02C 7/16; F02C 7/18; F02C 7/185; B64D 31/06; B64D 2033/0246; B64D 33/022; F05D 2260/607; F05D 2260/20; F05D 2260/201; F05D 2260/202; F05D 2260/203; F05D 2260/204; F05D 2260/205; F05D 2260/209;
(Continued)

(56) References Cited

U.S. PATENT DOCUMENTS 3,979,903 A * 9/1976 Hull, Jr. .................... F02C 7/05
 60/39.092
4,820,123 A * 4/1989 Hall ........................ F01D 5/081
 416/92

(Continued)

FOREIGN PATENT DOCUMENTS

EP        2655842 A1    10/2013
EP        2964925 A1    1/2016
(Continued)

OTHER PUBLICATIONS

PCT International Search Report corresponding to PCT Application No. PCT/US2017/067097 dated Apr. 13, 2018.
(Continued)

*Primary Examiner* — Andrew H Nguyen
*Assistant Examiner* — Stephanie Sebasco Cheng
(74) *Attorney, Agent, or Firm* — Dinsmore & Shohl LLP (57) ABSTRACT

A method and apparatus for a turbine engine having a compressor section, combustion section, and a turbine section in an axial flow arrangement with a cooling circuit in fluid communication with at least one of the compressor section, combustion section, or turbine section. The method and apparatus further including separating particles from a cooling air that flows through the cooling circuit.

23 Claims, 8 Drawing Sheets

(51) Int. Cl.
*B01D 49/02* (2006.01)
*B01D 45/16* (2006.01)
*F02C 7/052* (2006.01)

(52) U.S. Cl.
CPC .......... *F02C 7/141* (2013.01); *F05D 2210/40* (2013.01); *F05D 2220/32* (2013.01); *F05D 2250/232* (2013.01); *F05D 2260/20* (2013.01); *F05D 2260/213* (2013.01); *F05D 2260/607* (2013.01)

(58) Field of Classification Search
CPC ......... F05D 2260/211; F05D 2260/213; F05D 2260/221; F05D 2260/2212; F05D 2260/2214; F05D 2260/22141; F05D 2260/231; F05D 2260/232; F05D 2260/63; F04D 29/70; F05B 2260/63; F01D 5/046; F01D 5/08; F01D 5/18; F01D 5/182; F01D 5/183; F01D 5/184; F01D 5/186; F01D 5/187; F01D 5/188; F01D 5/189; F01D 9/023; F01D 6/065; F01D 11/24; F01D 25/08; F01D 25/12; F01D 25/125; F01D 25/14; F01D 25/145; F01D 25/32; F28D 15/0258; F02K 1/822; F02K 1/825
USPC ....... 55/42.2, 434, 434.4, 467, 482.1; 95/60, 95/67, 73, 288; 165/119
See application file for complete search history.

(56) References Cited

U.S. PATENT DOCUMENTS

| | | | |
|---|---|---|---|
| 4,860,534 A * | 8/1989 | Easley | F02C 7/047 60/39.092 |
| 4,913,711 A | 4/1990 | Stewart | |
| 5,123,939 A | 6/1992 | Morin et al. | |
| 6,308,511 B1 | 10/2001 | Beeck et al. | |
| 6,513,345 B1 | 2/2003 | Betting et al. | |
| 6,702,873 B2 * | 3/2004 | Hartman | B01D 46/0043 55/434 |
| 8,277,169 B2 * | 10/2012 | Riahi | F01D 5/081 415/115 |
| 8,974,584 B2 | 3/2015 | Castillo-Welter et al. | |
| 9,168,474 B2 | 10/2015 | Al-Garni et al. | |
| 9,879,603 B2 * | 1/2018 | Maguire | F01D 25/08 |
| 9,981,751 B2 * | 5/2018 | Fert | B64D 27/10 |
| 9,982,599 B2 * | 5/2018 | Suciu | F02C 7/052 |
| 10,030,581 B2 * | 7/2018 | Gekht | B64D 33/02 |
| 2005/0047914 A1 * | 3/2005 | Tomberg | F01D 5/187 416/97 R |
| 2006/0024164 A1 * | 2/2006 | Keith | F01D 5/081 416/97 R |
| 2008/0310951 A1 | 12/2008 | Bremer | |
| 2012/0159961 A1 | 6/2012 | Krautheim et al. | |
| 2013/0195621 A1 * | 8/2013 | Schwarz | F01D 25/162 415/118 |
| 2014/0119891 A1 | 5/2014 | Schmittenberg et al. | |
| 2014/0202121 A1 | 7/2014 | Beers et al. | |
| 2014/0356125 A1 | 12/2014 | Donovan et al. | |
| 2014/0360217 A1 | 12/2014 | Nicholas | |
| 2015/0292408 A1 | 10/2015 | Suciu et al. | |
| 2015/0300265 A1 | 10/2015 | Suciu et al. | |
| 2015/0337738 A1 | 11/2015 | Sucio et al. | |
| 2017/0335766 A1 * | 11/2017 | Pouyau | B64D 33/02 |

FOREIGN PATENT DOCUMENTS

| | | |
|---|---|---|
| JP | 11-311131 A | 11/1999 |
| JP | 2013-177833 A | 9/2013 |
| WO | 2012088543 A1 | 6/2012 |
| WO | 2014137417 A1 | 11/2013 |

OTHER PUBLICATIONS

JP Office Action for Application No. 2019-536293, dated Feb. 1, 2021.

* cited by examiner

PARTICLE SEPARATOR ASSEMBLY FOR A TURBINE ENGINE

BACKGROUND OF THE INVENTION

Engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation. Additionally, fluidic systems where the flow of dirty fluid, such as containing particulate matter, can include a downstream engine, such as in a tank or power plant.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components that require cooling. While the compressor air is a high temperature, it is cooler relative to the turbine air, and can be used to cool the turbine. When cooling the turbines, cooling air can be supplied to various turbine components, including the interior of the turbine blades and the turbine shroud.

Particles, such as dirt, dust, sand, volcanic ash, and other environmental contaminants in the engine intake air can cause sever compressor erosion. As the particles move through the engine they can melt in the combustion gases and subsequently resolidify on the turbine flow path surfaces. Particles entrained in the turbine cooling air can cause a loss of cooling due to deposition and plugging of the cooling passages. All of these effects cause reduced operational time or "time-on-wing" for the aircraft environment. This problem is exacerbated in certain operating environments around the globe where turbine engines are exposed to significant amounts of airborne particles.

BRIEF DESCRIPTION OF THE INVENTION

In one aspect, a turbine engine comprising an engine core having a compressor section, combustion section, and a turbine section in an axial flow arrangement, a cooling air circuit in fluid communication with at least one of the compressor section, combustion section, or turbine section, a particle separator fluidly coupled to the cooling circuit and defining a cooling air passage through which passes at least some of the cooling air in the cooling circuit, and a heat exchanger having at least one fluid channel integral with the particle separator.

In another aspect, a particle separator assembly comprising a particle separator and heat exchanger forming a monolithic structure, with the particle separator having a housing defining an airflow passage and the heat exchanger having a coolant passage formed in at least part of the housing.

In yet another aspect, a method of separating particles from an airflow with a particle separator defining an airflow passage and a scavenge passage, the method comprising flowing air through the airflow passage, drawing particles out of the airflow by changing the temperature of the primary airflow.

DESCRIPTION OF EMBODIMENTS OF THE INVENTION

The described embodiments of the present invention are directed to systems, methods, and other devices related to particle removal with a particle separator assembly where a particle separator is integral with a heat exchanger. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

As used herein, the terms "axial" or "axially" refer to a dimension along a longitudinal axis of an engine or along a longitudinal axis of a component disposed within the engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine, an outer engine circumference, or a circular or annular component disposed within the engine. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

As used herein, the terms "tangential" or "tangentially" refer to a dimension extending perpendicular to a radial line with respect to the longitudinal axis of the engine or the longitudinal axis of a component disposed therein.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Figure 1:
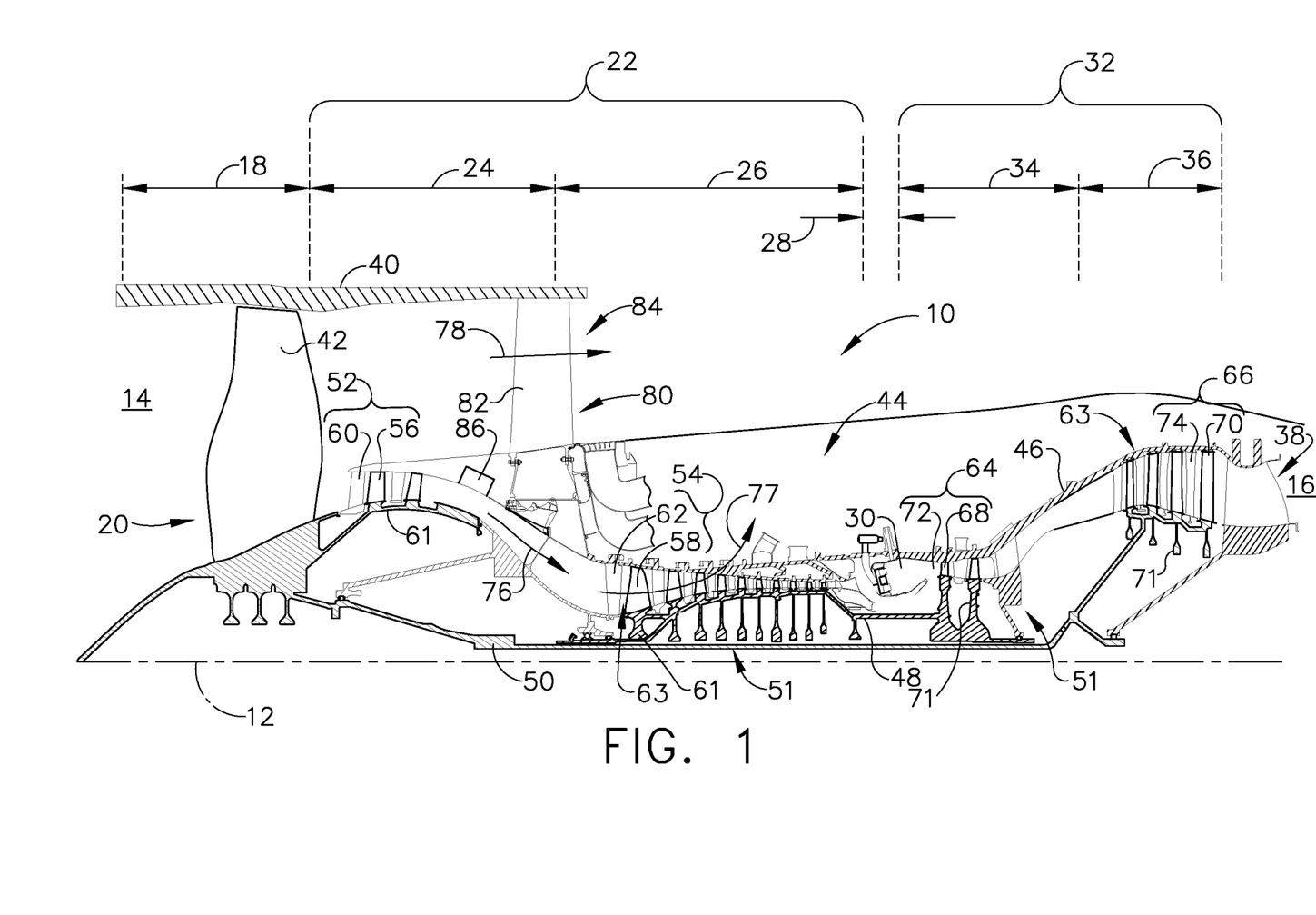
FIG. 1 is a cross-section view of a gas turbine engine of FIG. 1.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26. A particle separator assembly 86 can be fluidly coupled to any portion of the engine core such that some of the air passes through the particle separator assembly 86.

Figure 2:
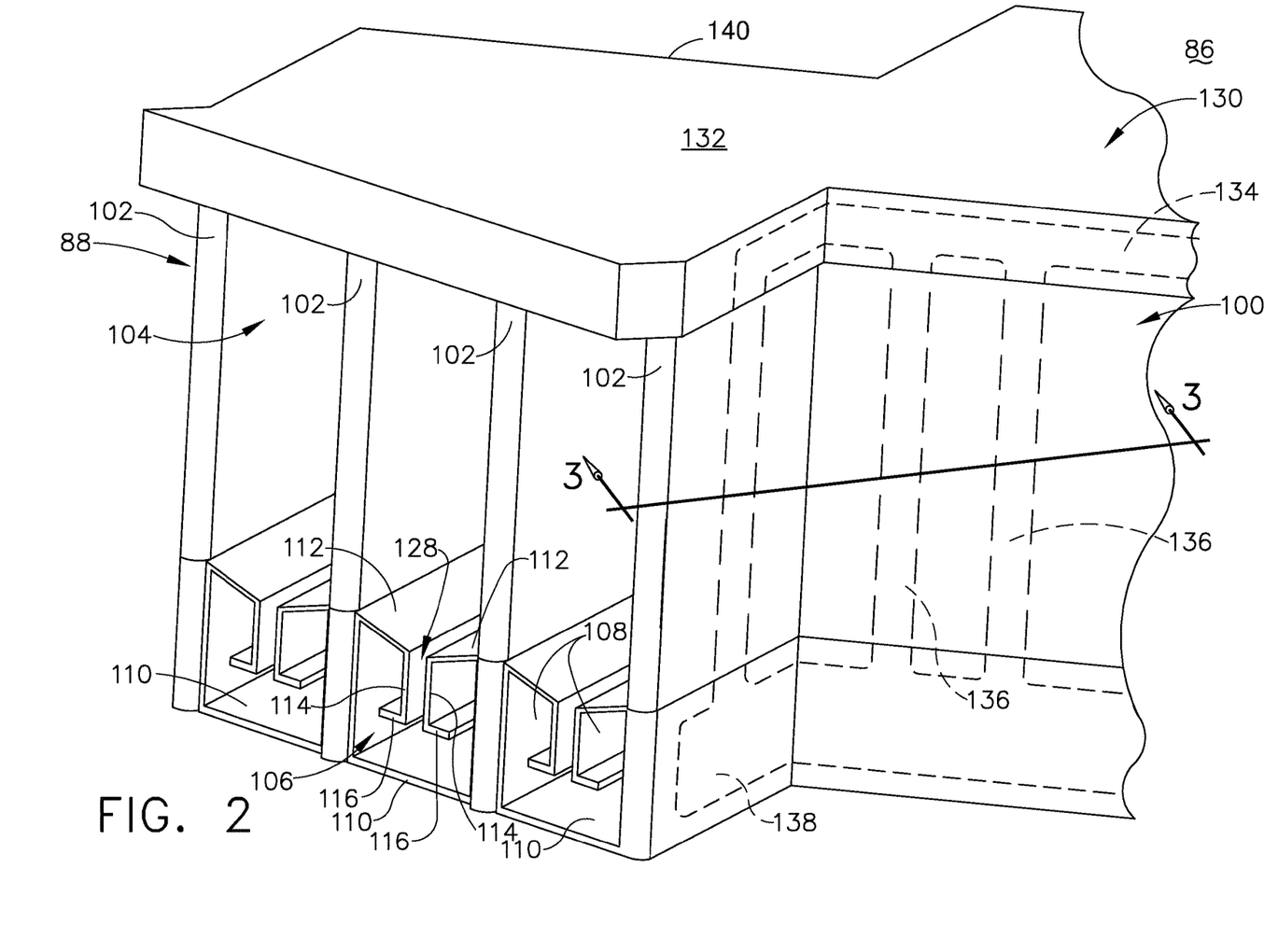
FIG. 2 is a perspective view of a particle separator assembly including a particle separator and a heat exchanger.

FIG. 2 is a perspective view of the particle separator assembly 86. The particle separator assembly 86 includes a particle separator 88 having a housing 100 with a set of walls 102. The set of walls 102 can be a plurality of walls taking on any shape or form. At least one airflow passage 104 is partially defined by the set of walls 102.

A structural duct 110 is provided within the airflow passage 104 to define a scavenge passage 106. The structural duct 110 includes a set of plenums 108 defining, in the exemplary illustration, three distinct chambers. While three chambers are illustrated, it should be understood that more or less chambers are contemplated, by way of non-limiting example, a single chamber defining the scavenge passage 106 is possible.

The set of plena 108 can be formed from one continuous piece of material, by way of non-limiting example steel, such that two substantially sloping surfaces 112 slope toward each other and terminate in parallel facing walls 114. A pair of bent ends 116 are formed perpendicular to the parallel facing walls 114 and bent away from the other of the pair of bent ends 116. A particle drain 128 is defined by the parallel facing walls 114 to fluidly couple the at least one airflow passage 104 to the scavenge passage 106. It should be understood that while a continuous piece of material is described, the shape and formation of the set of plenums 108 can be from any material, including by way of non-limiting example multiple pieces of material welded together, or a single scavenge passage 106 formed by additive manufacturing rather than bending. It should be further understood that the structural duct 110 can be in multiple airflow passages 104 as illustrated. The descriptions herein are for illustrative purposes and not meant to be limiting.

A heat exchanger 130 is integral with the particle separator 88 and includes a cover 132 further defining at least a portion of the at least one airflow passage 104. A supply channel 134 is provided within the cover 132. The heat exchanger 130 includes at least one fluid channel 136 located within the set of walls 102 and fluidly coupled to the supply channel 134. The at least one fluid channel 136 can be multiple fluid channels (shown in phantom) and illustrated by way of non-limiting example as extending from the supply channel 134 within the set of walls 102 toward the scavenge passage 106. A discharge channel 138 is also provided within the set of walls 102 proximate the scavenge passage 106 and is fluidly coupled to each fluid channel 136.

The supply channel 134, fluid channel 136, and discharge channel 138 can be any type of fluid channel and do not need to be discrete channels. By way of non-limiting example the channels can be pin bank channels or porous material provided within the cover 132 or set of walls 102 or in one or both of them. The non-limiting examples would still function to maintain uniform flow length like the fluid channels 134, 136, and 138 described herein.

It should be understood that while the particle separator 88 and heat exchanger 130 are integral and can form a monolithic structure 140, the airflow passage and scavenge passage 106 defining the particle separator 88 are fluidly isolated from the supply channel 134, fluid channel 136, and discharge channels 138 defining the heat exchanger.

It should be further understood that the particle separator assembly 86 can be an integral structure without forming a monolithic structure 140. The supply channel 134, fluid channel 136, and discharge channel 138 can be separate components that when assembled are in thermal contact with the particle separator 88. By way of non-limiting example, the fluid channel 136 can be provided on an exterior of the set of walls 102. As illustrated, the fluid channel 136 is provided within the set of walls 102 to form the monolithic structure 140 described herein.

Figure 3:
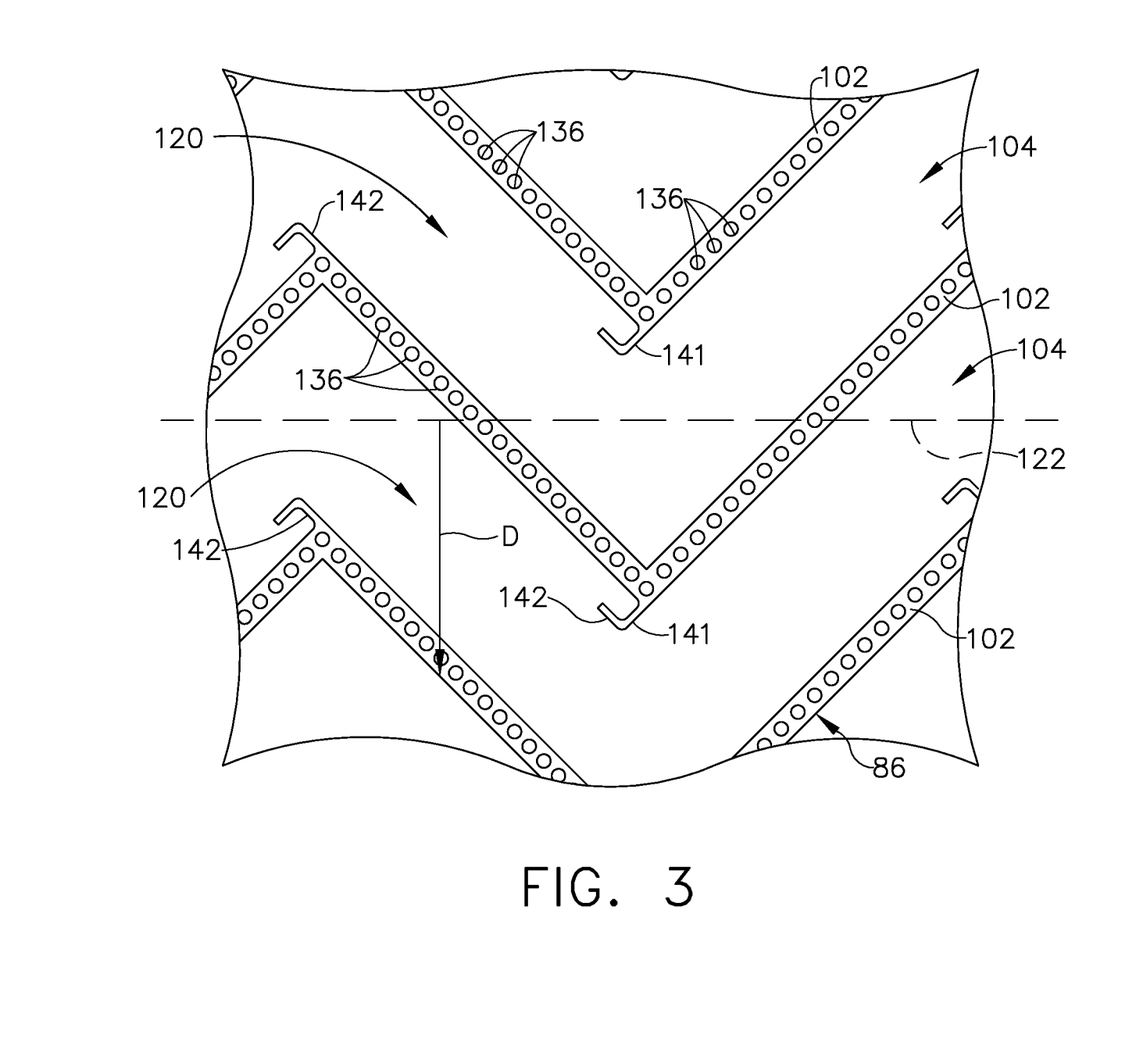
FIG. 3 is a cross-section view of the particle separator assembly from FIG. 2.

Turning to FIG. 3, by way of non-limiting example, the at least one airflow passage 104 can have a wave form defined by a plurality of corners 141. A body-axis 122 centrally located with respect to the entire particle separator assembly 86 illustrates a non-constant dimension of the particle separator assembly 86, such that differing dimensions D will be measured when measuring from an exterior of the set of walls 102 to the body-axis. At least one hook 142 can be provided along at least one of the plurality of corners 141. Air 120 passing through the airflow passage 104 will continuously have to change direction and move around the plurality of corners 141. It is further contemplated that particles in the air can be captured in the at least one hook 142 such that as the air passes through the airflow passage 104 it becomes progressively cleaner. Though illustrated with the at least one hook 142, it should be understood that the hook 142 is not meant to be limiting and is optional such that a hook can be part of the particle separator 88 in some capacity or not at all.

Figure 4:
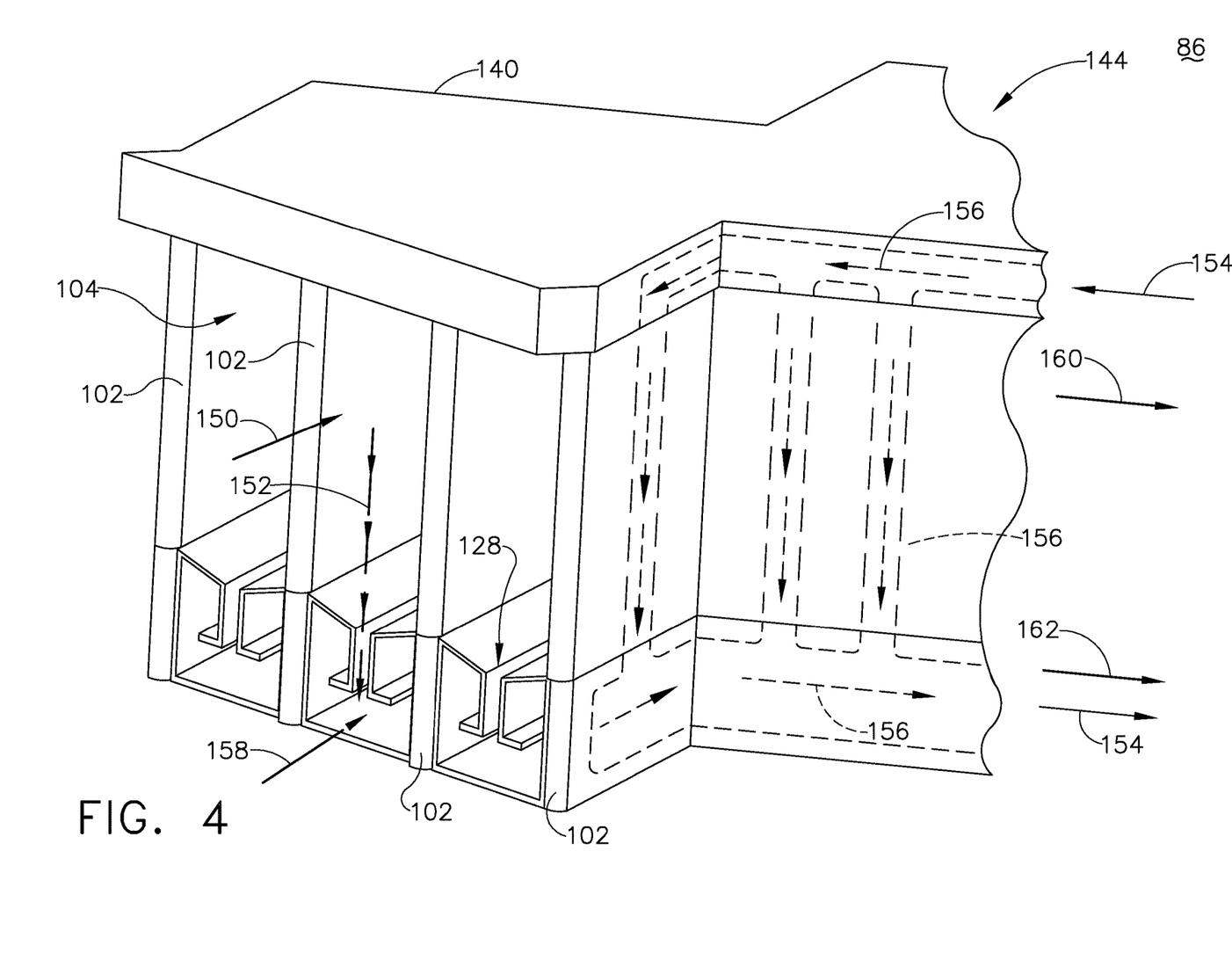
FIG. 4 is the same perspective view of FIG. 2 showing an airflow pattern.

Turning to FIG. 4, part of a cooling air circuit 144 that utilizes the monolithic structure 140 will be described using the illustration from FIG. 2. Cooling air 120 as a primary airflow 150 is introduced to the at least one airflow passage 104. The primary airflow 150 can be any air within the engine, such as air diverted from one of the compressor section 22, combustion section 28, or turbine section 32, and in need of cleaning. The primary airflow 150 moves through the airflow passage 104 as described herein such that some particles are captured by the set of hooks 142. Other particles 152 within the primary airflow 150 are removed from the primary airflow in that particles 152 can pass through the particle drain 128 and into the scavenge passage 106. Heavier particles 152 can pass through the particle drain 128 due to gravity, however it is also contemplated that additional particles 152 are drawn out of the primary airflow 150 and pass through the particle drain 128 due to thermophoresis.

For thermophoresis to occur, a fluid 154 is introduced to the supply channel 134 as a fluid supply 156. The fluid supply 156 moves through the fluid channels 136 and exits into the discharge channel 138. The fluid 154 can be by way of non-limiting example liquid coolant or bypass air. The fluid 154 can be any temperature where the fluid 154 is relatively warmer or colder than the primary airflow 150. It is the temperature difference between the fluid supply 156 and the primary airflow 150 that can attribute to thermophoresis.

Thermophoresis is labeled positive when particles move from a hot region to a cold region and negative when particles move from a cold region to a hot region. Typically heavier/larger particles exhibit positive behavior moving away from warmer regions. Therefore in a non-limiting example, if relatively warmer fluid is introduced to the supply channel 134, larger particles in the primary airflow 150 within the airflow passage will move away from the walls 102, away from the cover 132, and toward the scavenge passage 106 to pass through the particle drain 128 and becoming captured by the set of plena 108. Likewise, if cooler fluid is introduced to the supply channel 134, larger particles would move towards the walls 102 causing them to hit the wall and roll down the wall 102 into the scavenge passage 106 and become captured by the set of plena 108.

A method of separating particles from an airflow includes first flowing the primary air 150 through the airflow passage 104 and then drawing particles toward the scavenge passage 106 by changing the temperature of the primary airflow 150 as described herein. The method can further include introducing a flushing airflow 158 to the scavenge passage 106. The flushing airflow 158 can contribute to removing captured particles within the set of plena 108. The primary airflow 150 exits the airflow passage as a cleaner air 160 and is directed towards one of the compressor section 22, turbine section 32, or combustion section 28 as needed. The flushing airflow 158 exits as a dirty airflow 162 and can be reprocessed for cleaning, re-introduced to the turbine flow-path away from components sensitive to particles or discharged from the engine core to the fan stream.

Figure 5:
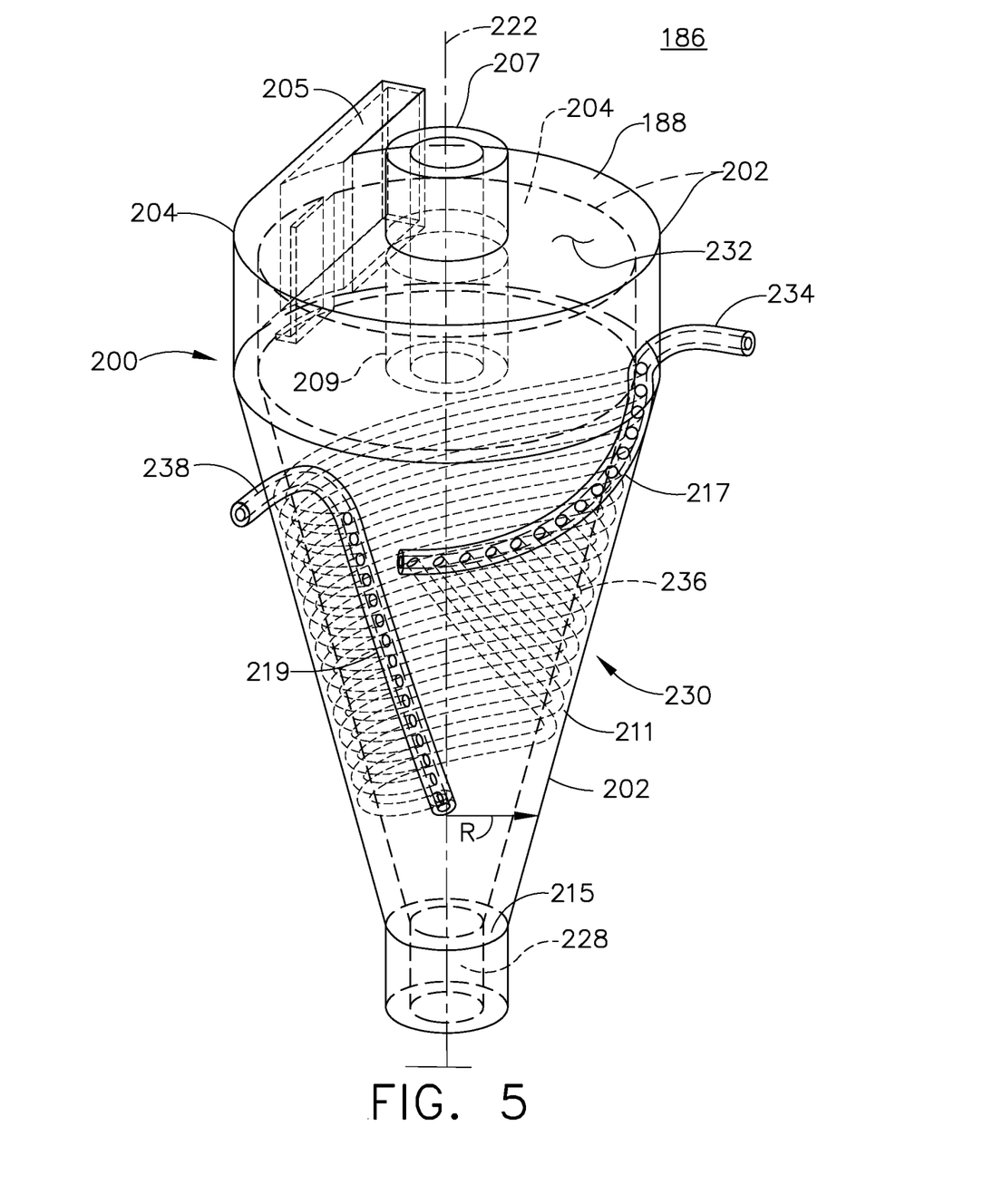
FIG. 5 is a perspective view of a second example of the particle separator from FIG. 2 with a heat exchanger.

FIG. 5 illustrates an alternative particle separator assembly 186. A second particle separator assembly 186 is similar in function to the exemplary particle separator assembly 86 illustrated in FIG. 2, therefore like parts will be identified with like numerals increased by 100. It should be understood that the description of the like parts of the first particle separator assembly 86 applies to the second particle separator assembly 186, unless otherwise noted.

The second particle separator assembly 186 includes by way of non-limiting example, a cyclone separator 188. The cyclone separator 188 includes a set of walls 202. The set of walls 202 can form a cylindrical housing 200 defining an airflow passage 204. An inlet duct 205 is fluidly coupled to the airflow passage 204. An exhaust pipe 207 extends through the top or ceiling 232 of the cylindrical housing 200 to define an inner boundary 209 of the airflow passage 204.

The set of walls 202 can further form a housing having some non-constant dimension as measured from a body-axis 222, by way of non-limiting example, a substantially conical housing 211, extending from the cylindrical housing 200. The conical housing 211 can define a radius R that changes along the body-axis 222. A particle drain 228 is provided at a base 215 of the conical housing 211 and is axially aligned with the exhaust pipe 207.

A heat exchanger 230 is integral with the cyclone separator 188 to form a monolithic structure 240 such that at least one fluid channel 236 is located within the set of walls 202 defining the conical housing 211. The at least one fluid channel 236 can be multiple fluid channels (shown in phantom) having the same lengths. When wrapped within the set of walls 202 to follow the cone shape of the conical housing 211 each fluid channel 236 begins at a same horizontal position 217 but ends at different horizontal positions 219. A supply channel 234 is provided along the same horizontal position 217 and is fluidly coupled to the at least one fluid channel 236. A discharge channel 238 is fluidly coupled to the at least one fluid channel 236 along the different horizontal positions 219 such that the discharge channel 238 and the supply channel 234 are in planes perpendicular to each other.

It should be understood that while the cyclone separator 188 and heat exchanger 230 are integral and can form a monolithic structure 240, the airflow passage 204 defining the cyclone separator 188 is fluidly isolated from the supply channel 234, fluid channels 236, and discharge channels 238 defining the heat exchanger 230.

It should be understood that the arrangement of fluid channels 236 as described herein is a non-limiting example. Fluid channels do not need to be discrete channels and by way of non-limiting example can be pin bank channels or porous material provided around the cyclone separator 188. The non-limiting examples would still function to maintain uniform flow length like the fluid channels 236 described herein.

It should be further understood that the particle separator assembly 186 can be an integral structure without forming a monolithic structure 240. The supply channel 234, fluid channel 236, and discharge channel 238 can be separate components that when assembled are in thermal contact with the particle separator 188. By way of non-limiting example, the fluid channel 236 can be provided on an exterior of the set of walls 202 such that the fluid channels 236 are wrapped around the cylindrical housing 200. As illustrated, the fluid channels 236 are provided within the set of walls 202 to form the monolithic structure 240 described herein.

Figure 6:
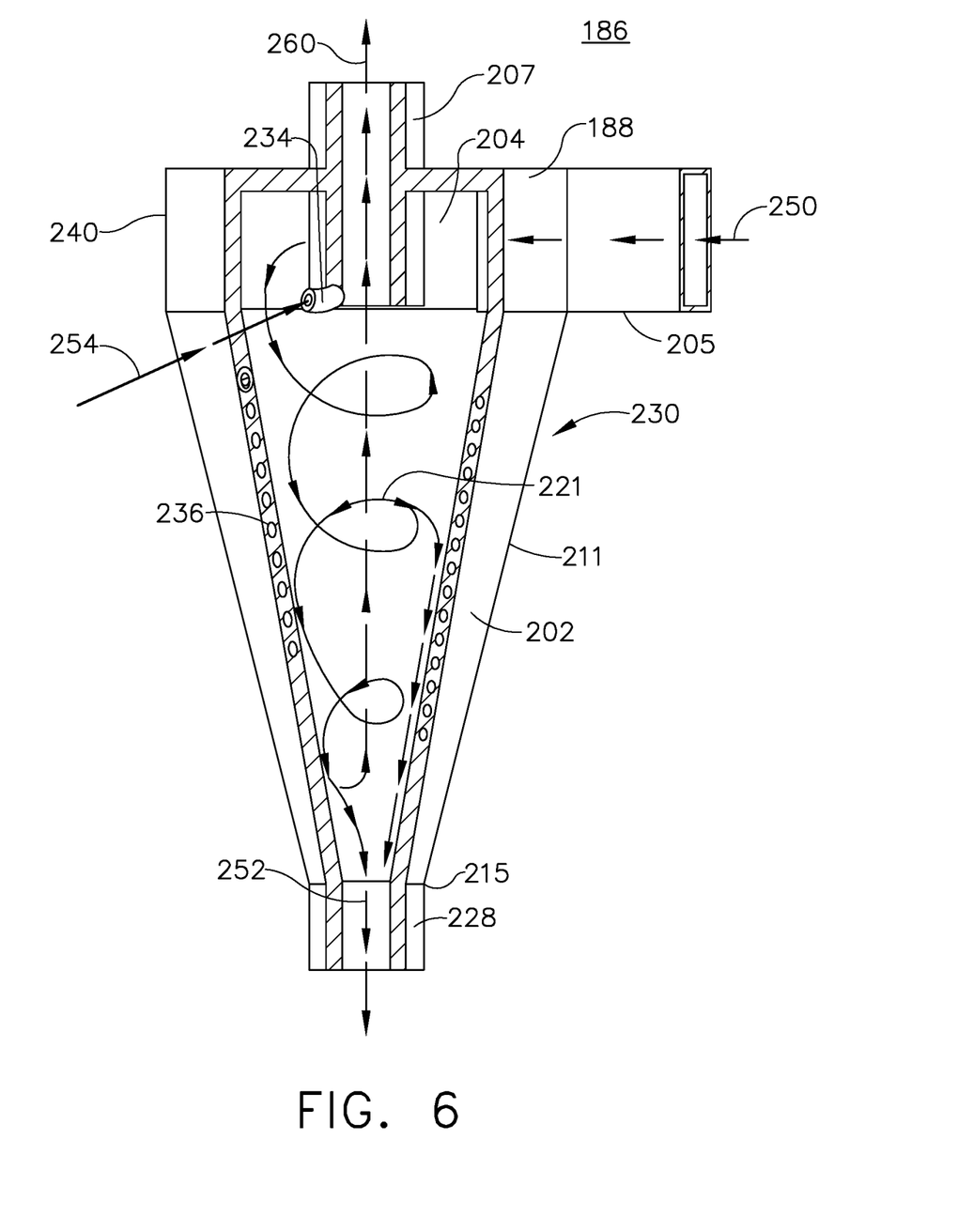
FIG. 6 is a cross-section view of the particle separator from FIG. 5.

FIG. 6 is a partially cut-away cyclone separator 188. During operation the cyclone separator 188 receives a primary airflow 250 through the inlet duct 205. The primary airflow 250 is introduced at a high speed such that the primary airflow 250 begins to flow in a helical pattern 221. Larger particles 252 with too much inertia to follow the tight curve of the helical pattern 221 strike the set of walls 202 and fall to the bottom exiting through the particle drain 228. Remaining cleaner air 260 moves out of the exhaust pipe 207.

Using the same principles as discussed herein regarding thermophoresis, a fluid 254 is introduced to the supply channel 234. The fluid 254 moves through the fluid channels 236. The fluid 254 as discussed herein should be a temperature relatively warmer or cooler than the primary airflow 250. In a non-limiting example, if relatively cooler fluid is introduced to the fluid channels 236, both inertia and thermophoresis, in this case a positive movement from a warmer to a cooler region, would contribute to larger particles striking the walls 202 and rolling down towards the particle drain 228.

Figure 7:
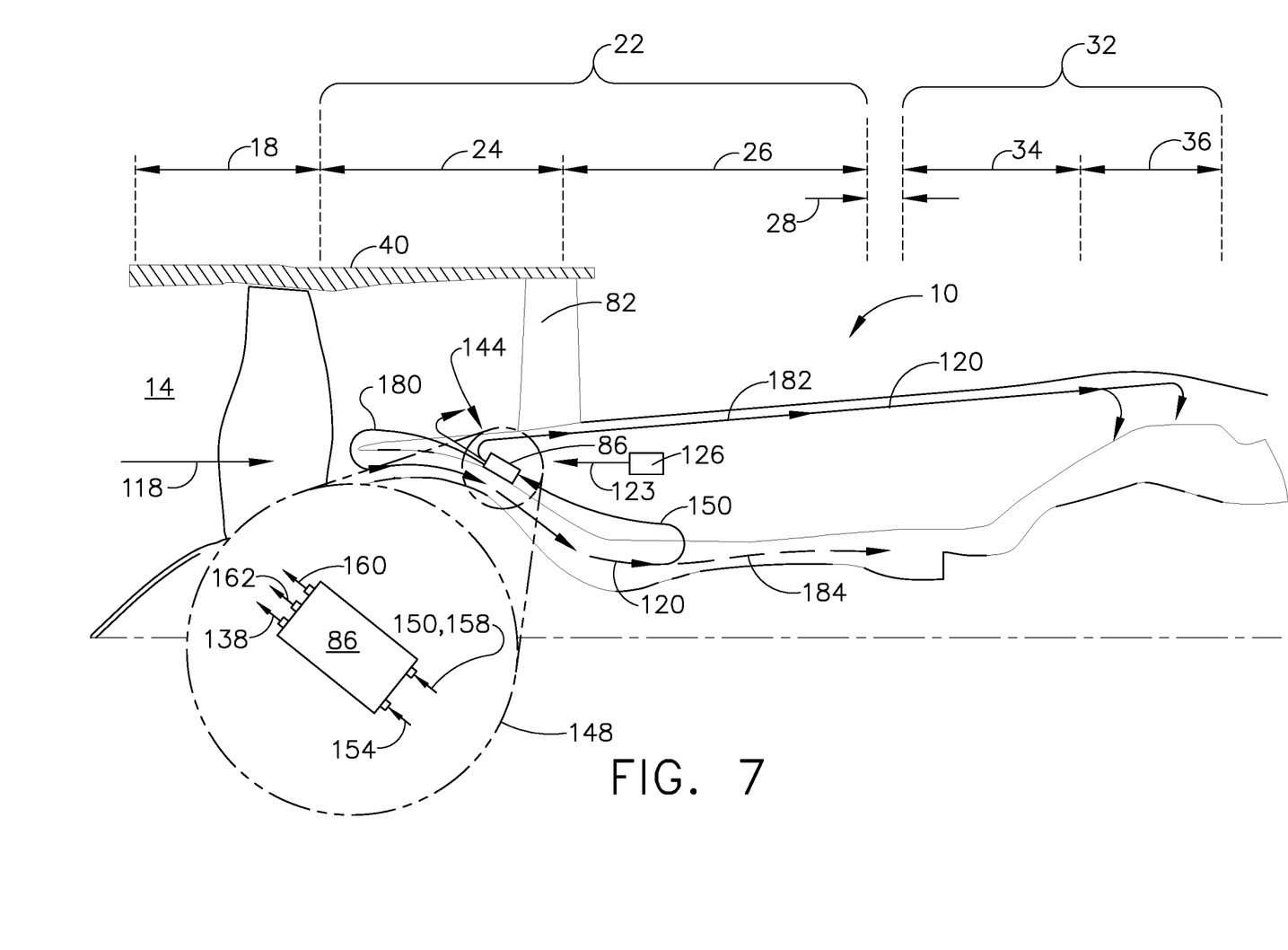
FIG. 7 is a simplified schematic of FIG. 1 with a cooling air circuit.

Turing to FIG. 7, a simplified schematic of the engine 10 illustrates the cooling air circuit 144 of which the particle separator assembly 86 is a portion of according to aspects of the disclosure described herein. A call out 148 of the particle separator 86 assembly 86 is provided for clarity. While only numerals corresponding to the first exemplary particle separator assembly 86 will be used, it is understood that the cooling air circuit 144 can include all particle separator assemblies 86 and their components as described herein.

A further portion of the cooling circuit 144 is in one of the compressor 22, combustor 30, or turbine sections 32. Additionally, the particle separator assembly 86 is fluidly coupled to at least one of the compressor section 22, combustion section 28, or turbine section 32 to define the airflow passage 104 which passes at least some of the cooling air 120 in the cooling circuit 144.

As can be seen in FIG. 7 the cleaner air 160 exiting the particle separator assembly 86 can, in a first route 180, begin as the primary air 150 and be collected from the compressor section 22 and introduced to the particle separator 86 part of the particle assembly 86 where it can be cleaned and directed back to the compressor as the cleaner air 160. Alternatively in a second route 182 cleaner air 160 can travel from the particle assembly 86 to the turbine section 32. In still another route 184, cleaner air 160 can be introduced to the combustion section 28. The primary air 150 can be drawn from by way of non-limiting example fan air 118 or bleed air 77 drawn from the HP compressor 26. The cleaner air 160 can be used to cool any of the areas of the engine as described herein or can be recycled back into the particle separator assembly 86 to produce even cleaner air.

It is contemplated that the fluid 154 used in the heat exchanger can be drawn from by way of non-limiting example fan air 118, coolant 123 located in a reservoir 126, or bleed air 77 drawn from the HP compressor 26. Similarly the primary airflow 150 and the flushing airflow 158 can be drawn from by way of non-limiting example the fan air 118 or bleed air 77. Upon exiting, the fluid 154 can be recycled and used again in the cooling air circuit 144 or discharged 124 through, by way of non-limiting example, the airflow guide vanes 82. Likewise, dirty airflow 162 can also be discharged through the airflow guide vanes 82, or by way of non-limiting example, used to cool other parts of the engine 10 such as engine oil 146. The cooling air circuit 144 as described herein is not limited, and can be routed in one or any combination of examples described herein or otherwise contemplated.

Figure 8:
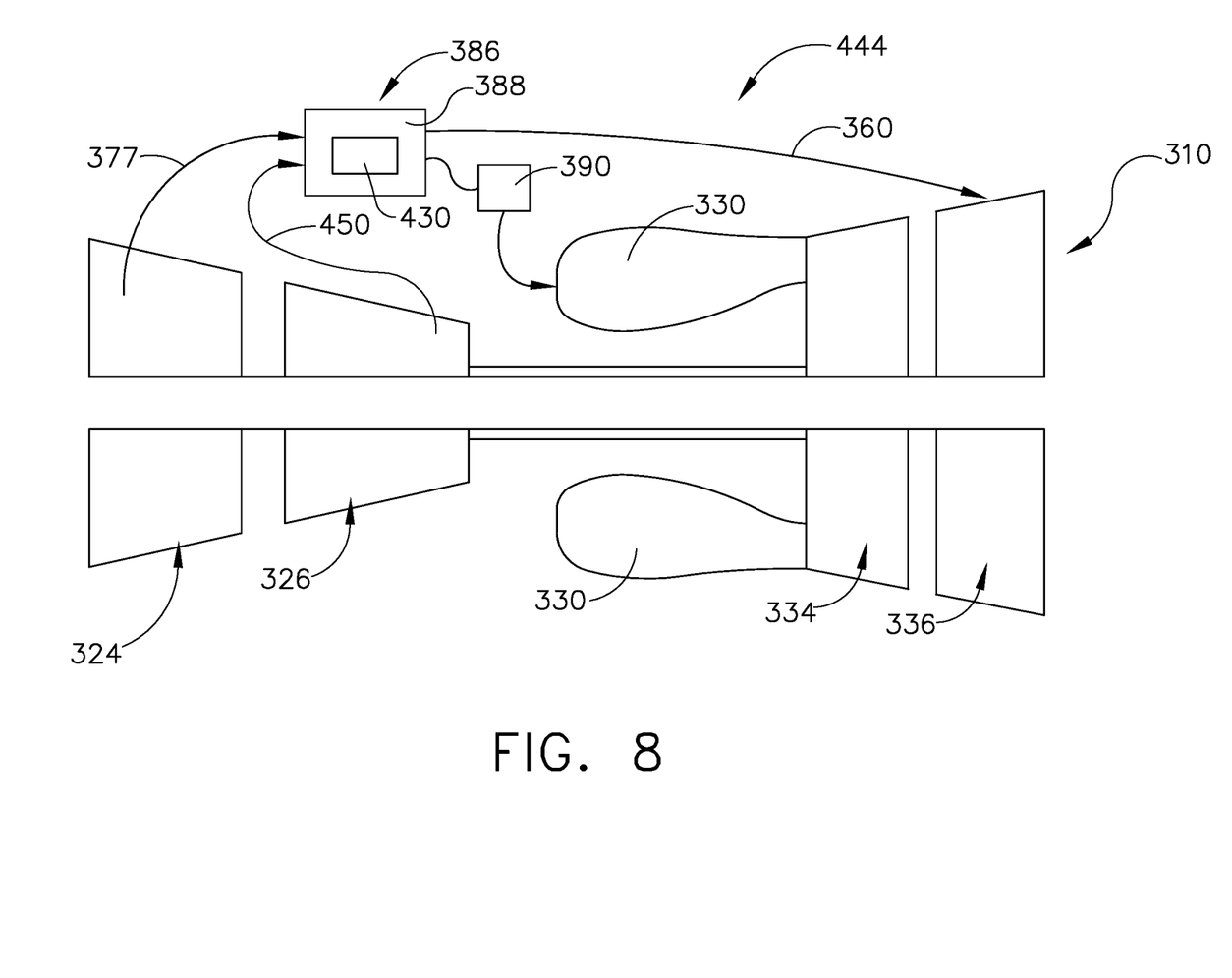
FIG. 8 is a simplified schematic of FIG. 1 with an additional exemplary cooling air circuit.

Turning to FIG. 8, an exemplary cooling circuit 444 is illustrated in a schematic of a turbine engine 310. The cooling circuit 444 is similar to the cooling circuit 144, therefore like parts will be identified with like numerals increased by 300, with it being understood that the description of the like parts of the first cooling circuit 144 applies to the second cooling circuit 444, unless otherwise noted. It should be further appreciated that descriptions associated with the second cooling circuit 444 the particle assembly 86 or the alternative particle separator assembly 186. These examples are not meant to be limiting and are for explanation purposes only.

A primary airflow 450 consisting of dirty air extracted from an HP compressor section 326 can be introduced to a particle separator assembly 386. Bleed air 377 from an LP compressor section 324 can be utilized to flush separated particles out of the particle separator assembly 386, or as a cooling fluid in a heat exchanger portion 430 of the particle separator assembly 386, or as a combination of both. Upon exiting the particle separator assembly 386, cleaner air 360 can be introduced various parts of the turbine engine 310 as needed.

The turbine engine 310 operates under various modes of operation. For example, the engine 310 can operate under first and second modes of operation which correspond with relatively low and high power output levels respectively. More specifically, the engine 310 can power an aircraft under a first, cruise-mode of operation and a second, takeoff-mode of operation. During takeoff, the engine 310 is effective for generating relatively large thrust output as compared to a relative small amount of thrust output generated during cruise operation. The temperature of the combustion gases in a combustor 330 is significantly higher during takeoff than during cruise, cooling air is typically provided for reducing the temperatures experienced by relatively hot engine components. For increasing the overall efficiency of the engine 310 during operation, cooling air must be efficiently channeled to the relatively hot engine components in only amounts required for the various modes of operation. Therefore, it is further contemplated that cleaner air 360 can be passed through a modulation apparatus 390 fluidly coupled to the particle separator assembly 386 and used to regulate the amount of cleaner air 360 introduced to relatively hot engine components in for example the HP turbine 336. Remaining air is then provided in the combustor 330.

A method of separating particles 152 from the primary airflow 150 with the exemplary particle separator assemblies 86, 186, 386 described herein includes flowing primary air 150 through the airflow passage 104 and drawing particles 152 out of the airflow 150 by changing the temperature of a portion of the airflow 150 to form a temperature gradient in the airflow 150 such that the drawn particles are removed from the airflow and flushed out of the particle separator 86. In the exemplary cyclonic separator 188, the method can further include flowing primary air 250 through the airflow passage 204 in a helical pattern 221.

It should be understood that cooling circuits 144, 444 as described herein are not limited to turbine engines in an aircraft and can be implemented in any type of engine including non-aircraft implementations. It should be further understood that the modulation apparatus 390 as described herein can have a controller and/or valve to control the incoming fluid and/or the outgoing fluid of the particle separator assembly and is not limited to the examples described herein.

It should be appreciated that the particle separator 86 disclosed herein utilizes a scavenge passage 106 to remove particles from the primary airflow 150 resulting in a cleaner airflow entering other parts of the engine. While illustrated as two plena 108, this approach can be applied to scavenge passages 106 with a plurality of plena 108.

It should also be further understood that the plurality of scavenge passages 106 are fluidly separate for the capturing of particles, but can be fluidly connected at a further stage for depositing of the particles or other purposes.

It should be appreciated that utilizing substantial turns as provided by the plurality of corners 141 can remove a greater portion of particulate matter entering the engine 10, as compared to other particle separators having smaller or no turns.

Additionally it should be understood that the particle separator assemblies 86, 186 as described herein can be integral with a larger separator/heat exchange device or system.

Benefits associated with the particle separator assemblies 86, 186 described herein include improved particle separation, reducing ingested sand within the engine and improving engine time on wing. Furthermore combining the particle separator 88, 188, 388 with a heat exchanger 130, 230, 430 to form an integral particle separator assembly 86, 186, 386 increases cycle efficiency by reducing pressure drops through combining separation and heat exchange functions into single packages.

It should be further understood that while the particle separator assembly 86, 186 as described herein is towards applications in a turbine engine for an aircraft, applications in power generation, oil and gas production, petro-chemical, and thermodynamic process industries with emphasis on weight or packaging are also contemplated.

It should also be understood that in an environment where a particle separator assembly 86, 186, 386 is not required, the particle separator assembly 86, 186, 386 can be designed to be removable to improve specific fuel consumption.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   an engine core having a compressor section, combustion section, and a turbine section in an axial flow arrangement;
   a cooling air circuit in fluid communication with at least one of the compressor section, combustion section, or turbine section;
   a particle separator fluidly coupled to the cooling air circuit;
   the particle separator comprising:
   a housing defining an airflow passage comprising an inlet and an outlet, and through which passes a primary airflow from the cooling air circuit;

a structural duct disposed within the airflow passage between the inlet and the outlet such that the primary airflow flows outside of the structural duct and a scavenge passage is formed within the structural duct; the structural duct further defining parallel facing, planar walls spaced from each other to form an elongated opening defining a particle drain defining a particle path from the airflow passage outside of the structural duct into the scavenge passage within the structural duct in a different direction from the primary airflow; and a heat exchanger having at least one fluid channel formed in a wall of the housing and fluidly separate from the airflow passage, the wall defining at least a portion of the airflow passage and the at least one fluid channel having an extent along the airflow passage between the inlet and the outlet that overlaps with an extent of the particle drain along the airflow passage between the inlet and the outlet.

2. The turbine engine of claim 1 wherein the particle separator and the heat exchanger define a monolithic structure.

3. The turbine engine of claim 1 wherein the at least one fluid channel comprises multiple fluid channels.

4. The turbine engine of claim 3 wherein at least some of the multiple fluid channels are of the same length.

5. The turbine engine of claim 3 wherein all of the multiple fluid channels am of the same length.

6. The turbine engine of claim 1 wherein the housing has a body-axis and the housing has a non-constant dimension relative to the body-axis.

7. The turbine engine of claim 6 wherein at least a portion of the housing is a wave form and the body-axis is centrally located with respect to the particle separator and the non-constant dimension is a length measured from the body-axis.

8. The turbine engine of claim 1 wherein the particle separator is fluidly coupled to a modulation apparatus.

9. The turbine engine of claim 1 wherein the structural duct further defines a set of plenums.

10. The turbine engine of claim 9 wherein the structural duct further defines sloping surfaces terminating in the parallel facing, planar walls.

11. The turbine engine of claim 10 wherein the set of plenums defines multiple chambers and the particle drain separates two of the multiple chambers and is fluidly coupled directly to a third chamber.

12. The turbine engine of claim 1 wherein the different direction is a second direction perpendicular to the primary airflow.

13. A particle separator assembly comprising:
a housing including at least one wall defining an airflow passage comprising an inlet and an outlet, and through which passes an airflow;

a structural duct disposed within the airflow passage between the inlet and the outlet such that the airflow flows outside the structural duct and a scavenge passage is formed within the structural duct;

the structural duct further defining parallel facing, planar walls spaced from each other to form an elongated opening defining a particle drain to conduct particles from the airflow passage outside the structural duct into the scavenge passage within the structural duct along a particle path extending in a different direction than the airflow; and a heat exchanger forming a monolithic structure with the housing, the heat exchanger having a fluid channel fluidly separated from the airflow passage and formed in the at least one wall, the wall defining at least a portion of the airflow passage and the fluid channel having an extent along the airflow passage between the inlet and the outlet that overlaps with an extent of the particle drain along the airflow passage between the inlet and the outlet.

14. The particle separator assembly of claim 13 wherein the fluid channel comprises multiple fluid channels.

15. The particle separator assembly of claim 14 wherein at least some of the multiple fluid channels are of the same length.

16. The particle separator assembly of claim 14 wherein all of the multiple fluid channels are of the same length.

17. The particle separator assembly of claim 13 wherein the housing with a body-axis and the housing has a non-constant dimension relative to the body-axis.

18. The particle separator assembly of claim 17 where the housing is a wave form and the body-axis is centrally located with respect to the particle separator and the non-constant dimension is a length measured from the body-axis.

19. The particle separator assembly of claim 13 wherein the particle separator is fluidly coupled to a modulation apparatus.

20. The particle separator assembly of claim 13 wherein the structural duct further defines a set of plenums.

21. The particle separator assembly of claim 20 wherein the structural duct further defines sloping surfaces terminating in the parallel facing, planar walls.

22. The particle separator assembly of claim 21 wherein the set of plenums defines multiple chambers and the particle drain separates two of the multiple chambers and is fluidly coupled directly to a third chamber.

23. The particle separator assembly of claim 13 wherein the different direction is a second direction perpendicular to the airflow.

* * * * *